United States Patent [19]

Fukazawa

[11] Patent Number: 5,473,436
[45] Date of Patent: Dec. 5, 1995

[54] SURFACE SHAPE MEASUREMENT DEVICE WITH SLIT PLATE AND SINGLE PHOTOELECTRIC CONVERTER

[75] Inventor: Chiaki Fukazawa, Tokyo, Japan

[73] Assignee: Kabushiki Kaisha Toshiba, Kawasaki, Japan

[21] Appl. No.: 389,976

[22] Filed: Feb. 14, 1995

Related U.S. Application Data

[63] Continuation of Ser. No. 88,021, Jul. 9, 1993, abandoned.

[30] Foreign Application Priority Data

Jan. 12, 1993 [JP] Japan ..................................... 5-003466

[51] Int. Cl.$^6$ ..................................................... G01B 11/00
[52] U.S. Cl. ........................................ 356/376; 250/559.23
[58] Field of Search ............................ 356/376; 250/560, 250/561

[56] References Cited

U.S. PATENT DOCUMENTS

4,939,379 7/1990 Horn ........................................ 356/376

Primary Examiner—F. L. Evans
Attorney, Agent, or Firm—Oblon, Spivak, McClelland, Maier & Neustadt

[57] ABSTRACT

A surface shape measurement device for measuring a surface shape of a measurement subject. The device includes a scanner for scanning the surface of the measurement subject with a light point, a lens for focusing an image of the light point on the surface of the measurement subject and a slit plate arranged at a position of a focal plane of the light point and having a plurality of apertures on a locus of the image of the light point. The device further includes a photoelectric converter arranged at a position to receive the light passing through the aperture for converting the light into a pulse signal and a signal processing circuit connected to receive the pulse signal for determining a position of the light point on the surface of the measurement subject based on a time-point of generation of the pulse signal, whereby the surface shape of the measurement subject is measured based on the position determined by the signal processing circuit.

9 Claims, 11 Drawing Sheets

SURFACE SHAPE MEASUREMENT DEVICE WITH SLIT PLATE AND SINGLE PHOTOELECTRIC CONVERTER

This application is a continuation of application Ser. No. 08/088,021, filed on Jul. 9, 1993, now abandoned.

BACKGROUND OF THE INVENTION

1. Field of the Invention

This invention relates to a surface shape measurement device, and more particularly to a device that measures the shape of the surface of plate-shaped articles such as constructional materials or steel plates.

2. Description of the Related Art

Figure 18A:
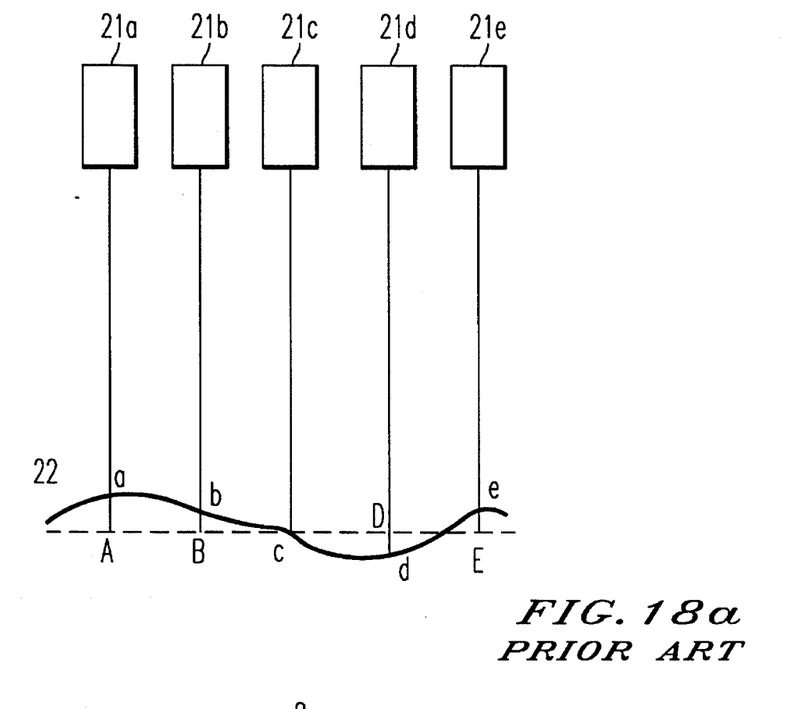
FIGS. 18(a) and 18(b) are layout diagrams of a conventional surface shape of measurement device.
Figure 18B:
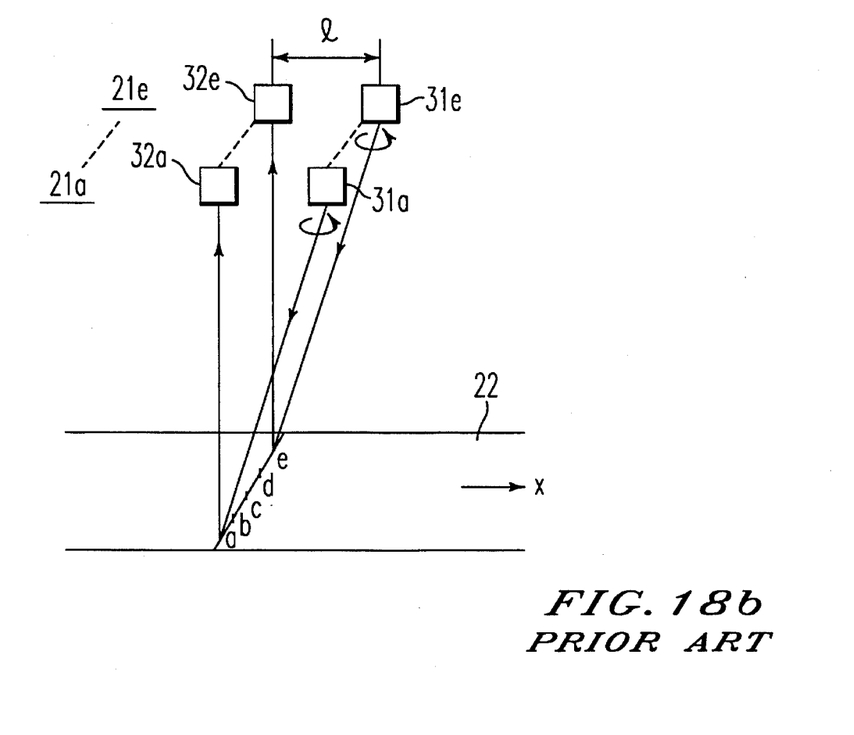

An example of a conventional surface shape measurement device is shown in FIG. 18. In FIGS. 18(a), and 18 (b)21a to 21e are a plurality of distance measuring devices. Measurement subject 22 moves in the direction perpendicular to the surface of the page, and the dotted line indicates a reference plane of measurement subject 22. These distance measuring devices 21a to 21e respectively measure the distance to the measurement surfaces 22a to 22e of measurement subject 22, whose surface shape is thereby found. The principle of the distance measurement is selected depending on the measurement conditions. Examples are triangulation, the optical section method, and the range finder method. This will be referred to as the first prior art example.

As one example of the first prior art, the triangulation is described in detail referring to FIG. 18(b). In this Figure, distance measuring devices 21a to 21e are constructed by scanners 31a to 31e and receivers 32a to 32e, respectively. Scanners 31a to 31e and receivers 32a to 32e are arranged perpendicularly to the direction of the movement of measurement subject 22 shown by an arrow X, respectively. Each pair of scanners 31a to 31e and receivers 32a to 32e in distance measuring device 21a to 21e is arranged in parallel to the direction shown by the arrow X and is arranged separately from each other by a length 1. Receivers 32a to 32e detect the time when measurement surfaces 22a to 22e are lighted by scanning beams from scanners 31a to 31e, respectively. Then distances to the measurement surfaces 22a to 22e from the reference plane are determined based on the detected times, respectively, and the surface shape of the measurement subject 22 is thereby found.

In a second prior art example, a laser beam etc. is used to describe a track on the surface of the measurement subject. This track is picked up by a CCD camera, and the surface shape is found from the bending of the track.

In the first prior art example, a plurality of distance measuring devices are needed. Indeed, to determine the surface shape in detail, a large number of distance measuring devices are required, resulting in high cost. In the triangulation described above, space longer than the length 1 is required in the direction of the movement of measurement subject 22 for arranging distance measuring devices 21a to 21e.

A system can be adopted in which the light source is scanned, but this also requires a plurality of photodetectors, so the problem is not solved. Also, in the second prior art example, the measurement takes time and so is unsuitable where the measurement subject is moving at high speed. Additionally, the light source usually needs a large amount of power.

SUMMARY OF THE INVENTION

Accordingly one object of this invention is to provide a surface shape measurement device whereby the surface shape of a measurement subject can be measured with high speed in a detailed and accurate manner by means of a single photodetector.

Another object of this invention is to provide a surface shape measurement device which can be arranged in a small space.

These and other objects of this invention can be achieved by providing a surface shape measurement device for measuring a surface shape of a measurement subject. The device includes a scanner for scanning the surface of the measurement subject with a light point, a lens for focusing an image of the light point on the surface of the measurement subject and a slit plate arranged at a position of a focal plane of the light point and having a plurality of apertures on a locus of the image of the light point. The device further includes a photoelectric converter arranged at a position to receive the light passing through the aperture for converting the light into a pulse signal and a signal processing circuit connected to receive the pulse signal for determining a position of the light point on the surface of the measurement subject based on a time-point of generation of the pulse signal, whereby the surface shape of the measurement subject is measured based on the position determined by the signal processing circuit.

In the above construction, the image produced by the lens of the light point that is scanned on the surface of the measurement subject advances over the focusing plane as scanning proceeds. The time-point at which the image of the light point passes through a point on its locus is then in a fixed geometrical relationship with the position on the surface of the measurement subject. It is therefore possible to determine the surface shape of the measurement subject by receiving the light that passes through a plurality of apertures provided at appropriate intervals on the locus at the position of the focusing plane with a single photoelectric converter and measuring the time from commencement of scanning up to the time-point where a pulse signal is generated from the photoelectric converter, thereby ascertaining the position of the light point on the surface of the measurement subject. This determination can be performed at high speed and in a detailed manner by raising the scanning speed of the scanner and employing a photomultiplier or the like, which has a high speed of response, as the photoelectric converter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, the embodiments of this invention will be described below.

Figure 1:
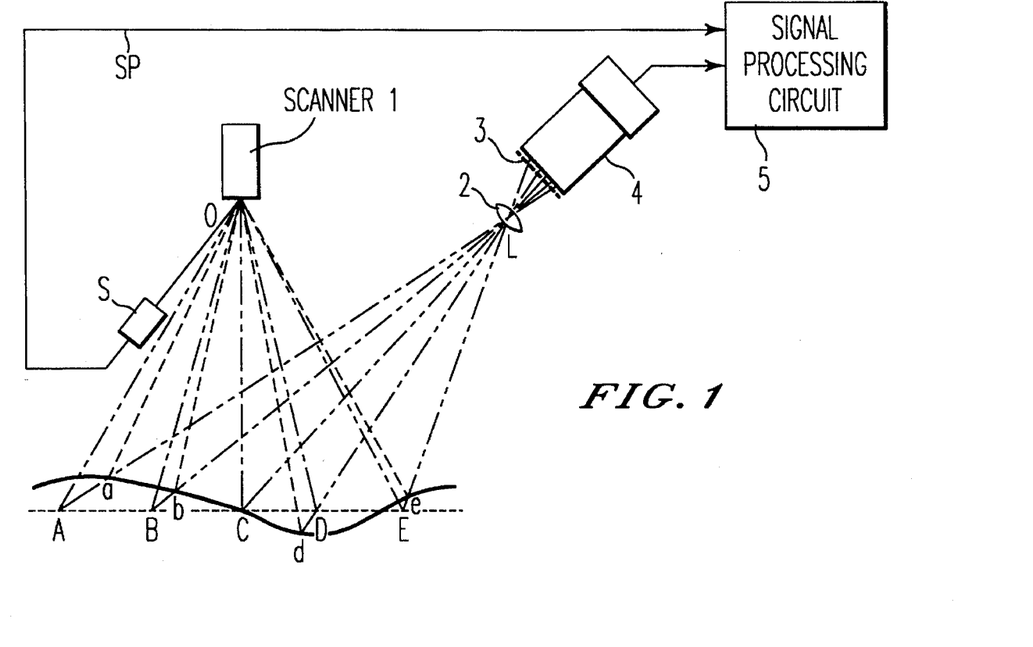
FIG. 1 is a layout diagram showing a surface shape measurement device according to a first embodiment of this invention.

FIGS. 1 through 4 are views showing a first embodiment of this invention. First of all, the construction of a surface shape measurement device will be described using FIG. 1. In FIG. 1, 1 is a scanner, such as a laser beam scanner by rotating mirrors, that scans the surface of measurement subject 7 with a light point, 2 is a lens that focuses the image of this light point. Lens 2 is positioned such that its center is located on the plane containing the light beams that issue from scanner 1. By this mode of arrangement, the locus of the image of the light point is a straight line, irrespective of position on the surface of measurement subject 7. At the position of the focal plane, there is arranged a slit plate 3 having a plurality of apertures on the locus of the light point image. At its back face, there is arranged a single photoelectric converter 4 constructed by, as an example, a photomultiplier that converts to pulse signals the light passing through the apertures.

There is also provided a scanning commencement pulse generator S which generates a scanning commencement pulse SP when it receives scanning beam from scanner 1. The pulse SP is applied to signal processing circuit 5. Scanner 1, lens 2 and generator S are arranged such that the plane containing them is perpendicular to reference plane 6 of measurement subject 7.

Signal processing circuit 5 ascertains the position of the light point on the surface of measurement subject 7 from the time taken from the start of scanning up to the time-point where a pulse signal is generated from photoelectric converter 4. The surface shape of the measurement subject is thereby detected. 6 is a reference plane, which is an imaginary surface for measurement purposes. Measurement subject 7 moves in the direction perpendicular to the surface of the paper.

Figure 2A:
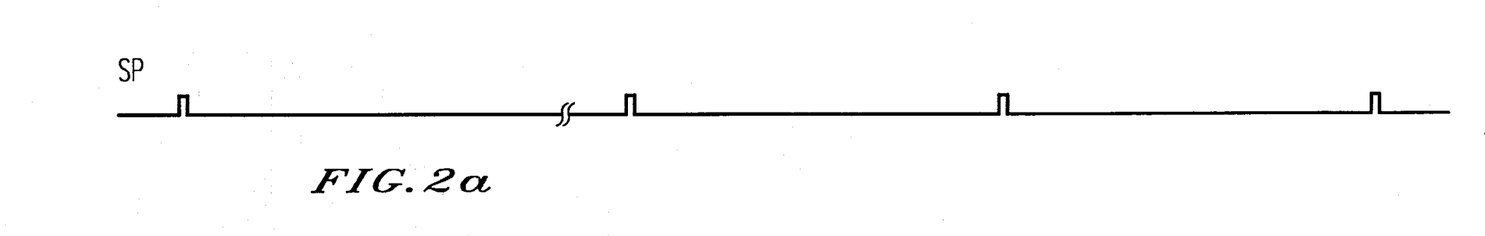
FIG. 2 is a timing chart given in explanation of the operation of the first embodiment.
Figure 2B:
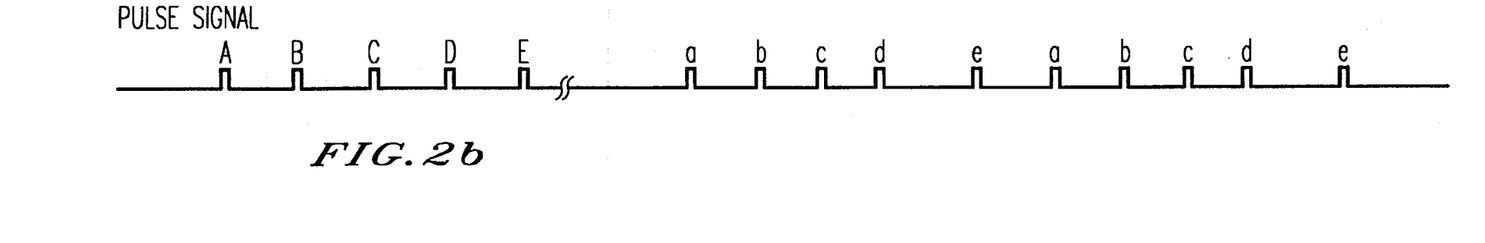

Next, the operation of this embodiment constituted as described above will be described. The image produced by lens 2 of the light point that is scanned on the surface of measurement subject 7 advances over the focal plane as scanning proceeds, its locus being a straight line irrespective of position on the surface of measurement subject 7. Since the instant at which the image of the light point passes a point on this straight line has a fixed geometrical relationship with a position on the surface of measurement subject 7, it is possible to ascertain the position of the light point on measurement subject 7 and to detect the surface shape of measurement subject 7 by measuring the time from the commencement of scanning up to this instant. This will be described in more detail with reference to FIG. 2 through FIG. 4. If now respective apertures are provided in slit plate 3 at the images of each of the points A, B, C, D and E on reference plane 6, if we assume that the surface of measurement subject 7 is of the shape shown in FIG. 1, when the light point passes a, b, c, d and e on this surface, the image of the light point passes through each of the apertures on slit plate 3. FIG. 2 shows the pulse signals that are output from photoelectric converter 4 and the pulse signal SP that is output from scanning commencement pulse generator S at the point of commencement of scanning of scanner 1. The pulse signals A to E are obtained on light-point scanning over reference plane 6 in advance before moving measurement subject 7. Then pulse signals a to e are obtained when scanning over the surface of measurement subject 7 after moving measurement subject 7. In the following scanning, a pulse train including pulse signals SP and a to e is generated. The position of the light point on the surface of measurement subject 7 can be obtained as follows by measuring the time-point at which these pulse signals are generated.

Figure 3:
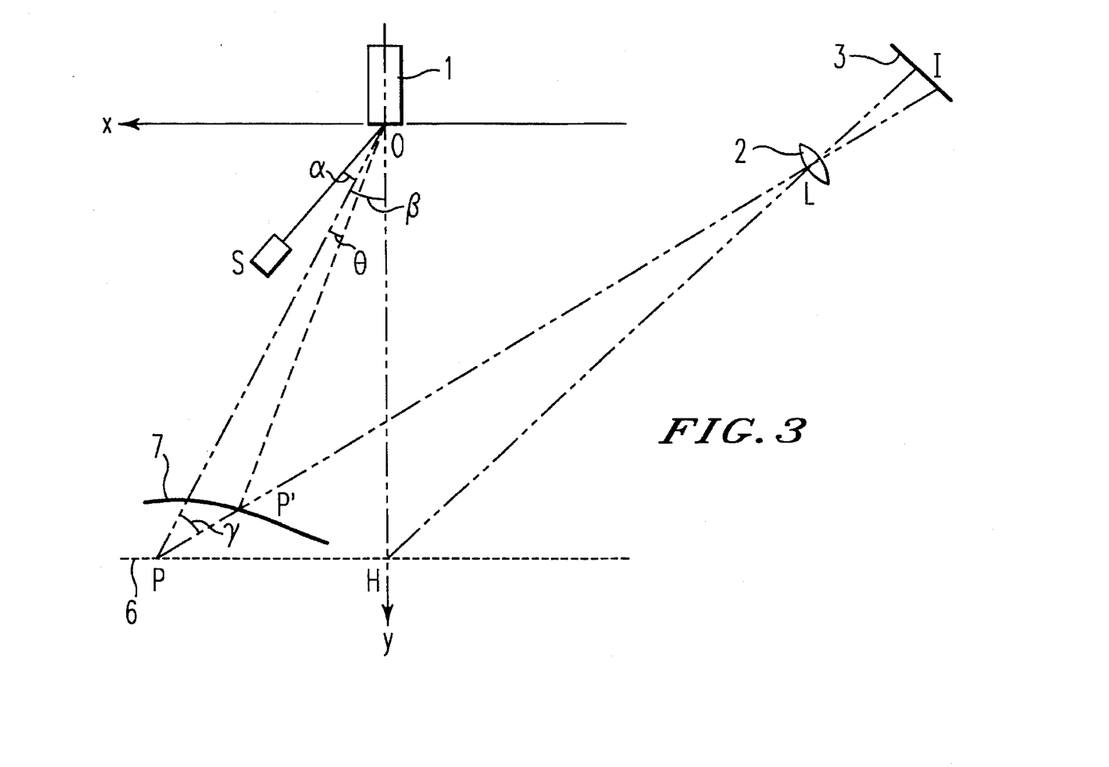
FIG. 3 is a light path diagram given in explanation of the operation of the first embodiment.

The principles of measurement are shown in FIG. 3. Supposing that there is an aperture I in slit plate 3 corresponding to a point P on reference plane 6, when the light point arrives at point P' of intersection with line segment PI on the surface of measurement subject 7, the image of the light point passes through aperture I. Also, when the scanning beam has arrived at the position of scanning commencement pulse generator S, a scanning commencement pulse signal SP is generated. Orthogonal co-ordinates x, y are taken as shown in FIG. 3, taking the centerpoint O of the scanning of scanner 1 as the origin of the co-ordinates.

Let $\angle SOP = \alpha, \angle POH = \beta, \angle OPL = \gamma$, and $\angle POP' = \theta$.

$\alpha$, $\beta$ and $\gamma$ are determined beforehand from the position of the various structural elements such as scanner 1, lens 2 and so on Applying the sine rule in $\triangle OPP'$, $$OP'/\sin \gamma = OP /\sin (\pi-\theta-\gamma) \tag{1}$$

is obtained. In the above expression, OP' and OP indicate the respective line segments. Hence, line segment OP' can be found as:

$$OP' = OP \cdot \sin \gamma / \sin (\theta - \gamma) \tag{2}$$

Figure 4:
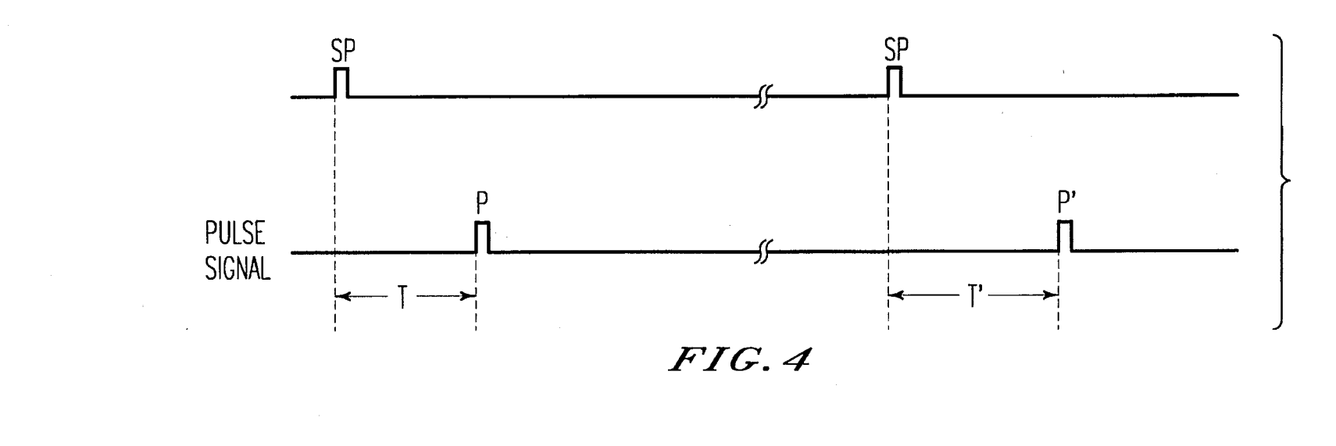
FIG. 4 is a timing chart given in explanation of the operation of the first embodiment, and is appended to FIG. 3.

$\theta$ is found as follows. FIG. 4 shows the scanning commencement pulse signal SP and the pulse signals that are output from photoelectric converter 4 at the respective points P, P'. If we assume that the pulse signals P, P' are generated after T, T' with the scanning commencement pulse signal S as the origin, and also assume that the angular velocity of scanning of scanner 1 has a constant value ω, we have:

$$\alpha = \omega \cdot T \quad (3)$$

$$\theta = (T'-T)\omega \quad (4)$$

and, from the two expressions (3) and (4), we have:

$$\theta = [(T'/T)-1]\alpha \quad (5)$$

since T is determined from the angular velocity ω of scanner 1 and α, θ can be found by measuring the time T'.

The co-ordinates (x, y) of the point P' are:

$$x = OP' \cdot \sin(\beta - \theta) \quad (6)$$

$$y = OP' \cdot \cos(\beta - \theta) \quad (7)$$

However, if θ is known from expression (5), segment OP' is determined from expression (2), so the co-ordinates of the point P', i.e. the position of the light point on the surface of measurement subject 7, can be found by expressions (6) and (7). Summarizing the above, the position of the light point is found by measuring the time T'. In the case of FIG. 1, the co-ordinates of each of the points a to e can be found in the same way as described above, so, based on this the surface shape of measurement subject 7 can be determined.

Signal processing circuit 5 ascertains the position of the light point on the surface of measurement subject 7 as follows:

The start of scanning is detected by scanning commencement pulse SP. The pulse signal is applied from photoelectric converter 4. Then the time T' from the start of scanning up to the time-point where a pulse signal is generated from photoelectric converter 4 is determined. As the time T is already determined, the co-ordinates (x, y) of the point P' are calculated from expressions (5), (6) and (7).

To execute the above-described processing, signal processing circuit 5 can easily be constructed with a microprocessor or discrete hardware components by those skilled in the art. So, the detailed description of the example of the construction of signal processing circuit 5 may be omitted.

In the above description, time T is determined in advance before moving measurement subject 7, then times T' are determined continuously corresponding to points P' when measurement subject 7 moves.

As described above, with this embodiment the positions of a plurality of points on the surface of measurement subject 7 can be detected by a single light point scanning. Furthermore, costs can be lowered by using only a single photoelectric converter, instead of needing to provide a plurality of optical sensors. Space for providing this embodiment is also reduced by constructing such that scanner 1, lens 2 and generator S are arranged on a plane.

Moreover, repeating the measurement describe above corresponding to moving the measurement subject 7, the three dimensional surface shape thereof can be measured.

Figure 5:
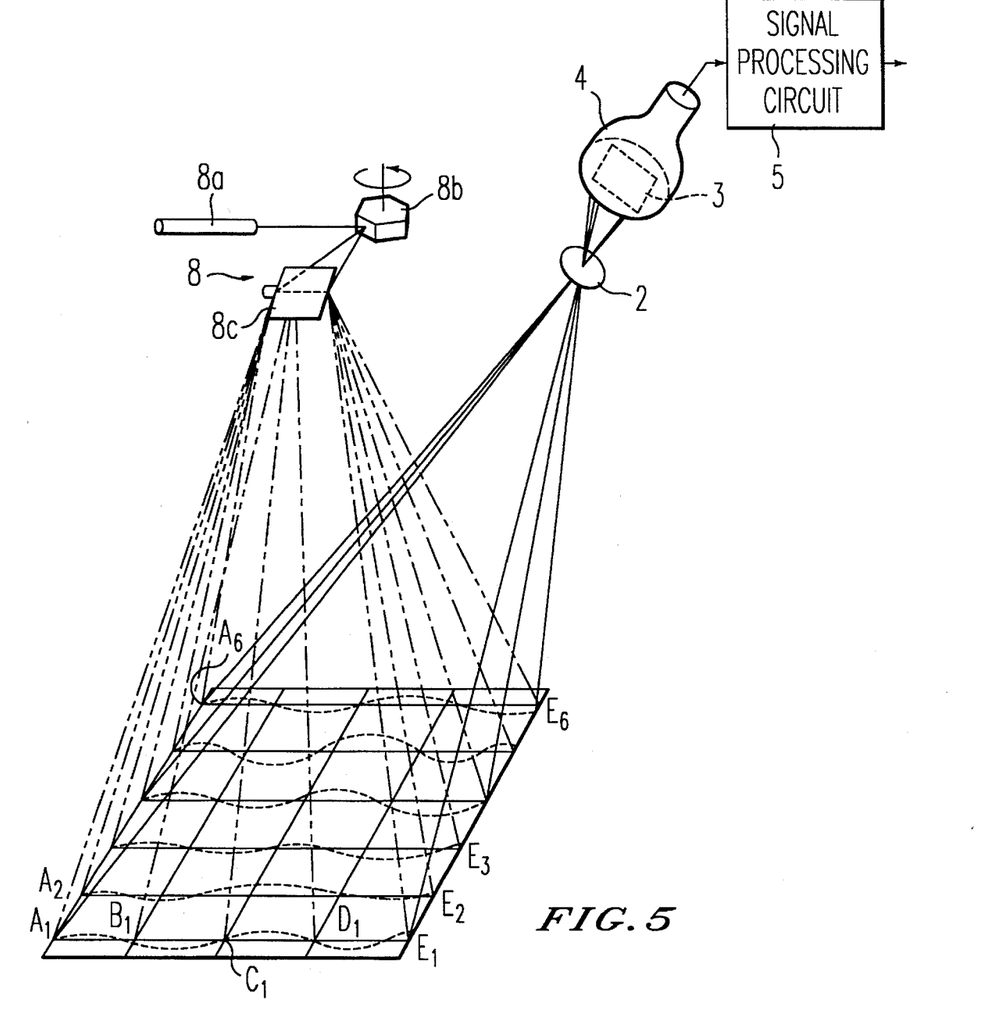
FIG. 5 is a layout diagram showing a second embodiment of this invention.
Figure 6:
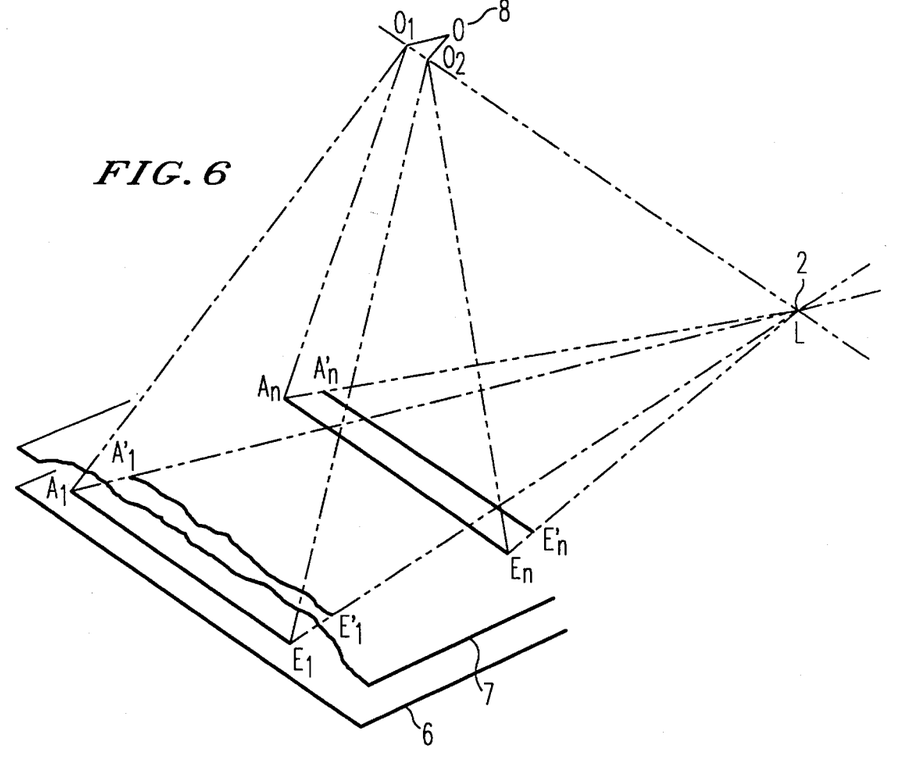
FIG. 6 is a light path diagram given in explanation of the operation of the second embodiment.

Next, a second embodiment of this invention is shown in FIG. 5 and FIG. 6. In this embodiment, a scanner 8 is constructed such that it can scan the surface of measurement subject 7 two-dimensionally by means of a light point, so that the three-dimensional shape of surface of measurement subject 7 can be determined. With this in view, scanner 8 is constructed of a beam light source 8a, a rotary mirror 8b that scans the light beam from beam light source 8a in the x direction (direction A1→E1 in the Figure), and a vibrating mirror 8c that scans this scanning beam of rotary mirror 8b in the y direction (direction A1→A6 in the Figure).

Thus, scanner 8 scans the surface of measurement subject 7 with the light point in the directions: A1→E1, A2→E2, . . . In each of these scanning processes, for example A1 to E1, the surface shape of measurement subject 7 can be found by the same process as in the case of embodiment 1 described above. In order to implement this, it is necessary for the image of the light point to be on the same straight line as in the case of the reference plane during a single scan, for example A1 to E1, irrespective of vertical position on the surface of measurement subject 7. To this end, lens 2 is arranged as shown in FIG. 6. That is, lens 2 is arranged on the line of intersection of the planes created by the light beam in each scan (straight lines $0_1$–$0_2$ in FIG. 6). With such an arrangement, the image of the curve A1'E1' described by the light point on the surface of measurement subject 7 corresponding to straight line A1 E1 on reference plane 6 is a straight line at the focal plane. The reason for this is that, since curve A1' E1' is on the plane L A1 E1, the line of intersection of this plane and the image surface (plane) is a straight line. The above holds in the same way for other scans An En. Thus, the three-dimensional shape of the surface of measurement subject 7 can be detected in this embodiment as described above. This embodiment is well applied to a case where measurement subject 7 is not movable.

Figure 7:
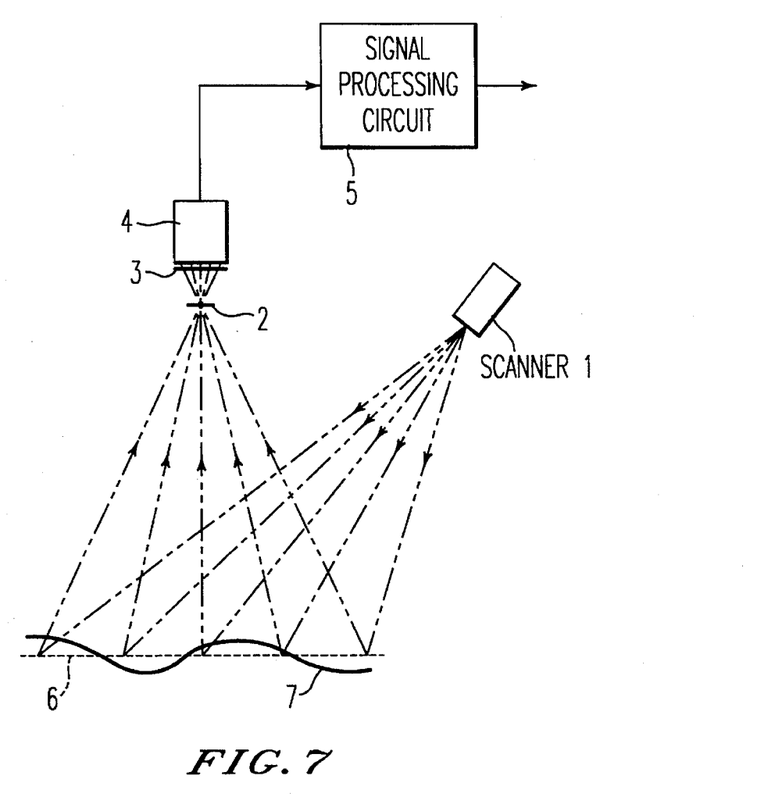
FIG. 7 is a layout diagram showing a third embodiment of this invention.

FIG. 7 shows a third embodiment of this invention. This embodiment differs from the layout of the first embodiment shown in FIG. 1 only in that the position of scanner 1 and the positon of the photodetector unit consisting of lens 2, slit plate 3 and photoelectric converter 4 are exchanged. The operation is the same as in the first embodiment except for the opposite relationship regarding optical emission and detection.

Figure 8:
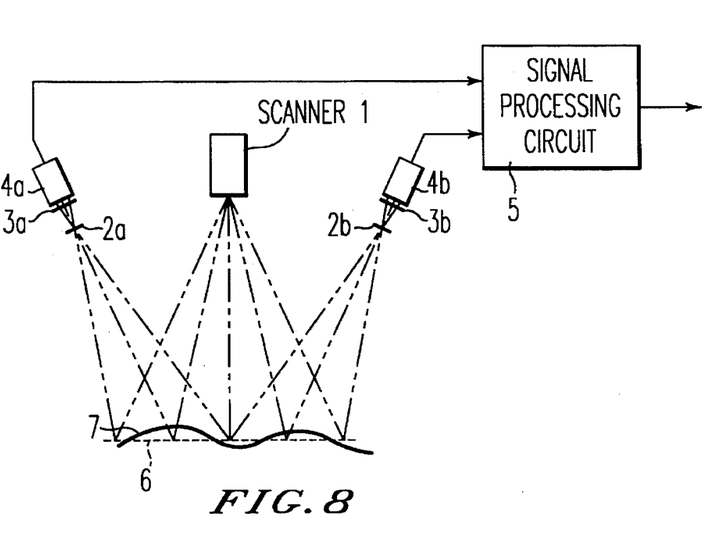
FIG. 8 is a layout diagram showing a fourth embodiment of this invention.

FIG. 8 shows a fourth embodiment of this invention. In this embodiment, two photodetector units consisting of lenses 2a and 2b, slit plates 3a and 3b and photoelectric converters 4a and 4b, respectively, are arranged symmetrically with respect to scanner 1. The action of each photodetector unit is the same as in the first embodiment described above. But it is possible to prevent increased measurement error resulting from the small quantity of light received if the scanning point is far from the photodetector unit when the surface of measurement subject 7 is nearly specular. A further advantage is that the angle with which the light is projected and the angle with which the light is received can be apportioned in directions such as to give a best measurement accuracy.

Figure 9:
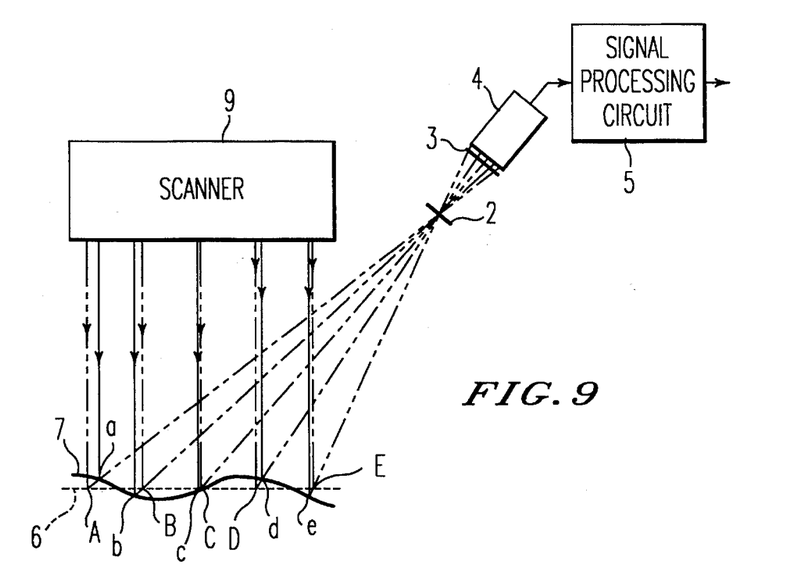
FIG. 9 is a layout diagram showing a fifth embodiment of this invention.

FIG. 9 shows a fifth embodiment of this invention. In this embodiment, scanner 9 is a parallel optical scanning type. In this embodiment also, the operation is the same as in the case of the first embodiment. Namely, the shape of the surface of measurement subject 7 is detected by measuring the time-point at which a pulse signal is output from photoelectric converter 4 when the image of the scanning light point passes through an aperture.

The principle of measurement is different from those shown in FIG. 3. But it can be easily found by those skilled in the art. So, the detailed description of the principle and the construction of signal processing circuit 5A may be omitted.

Figure 10:
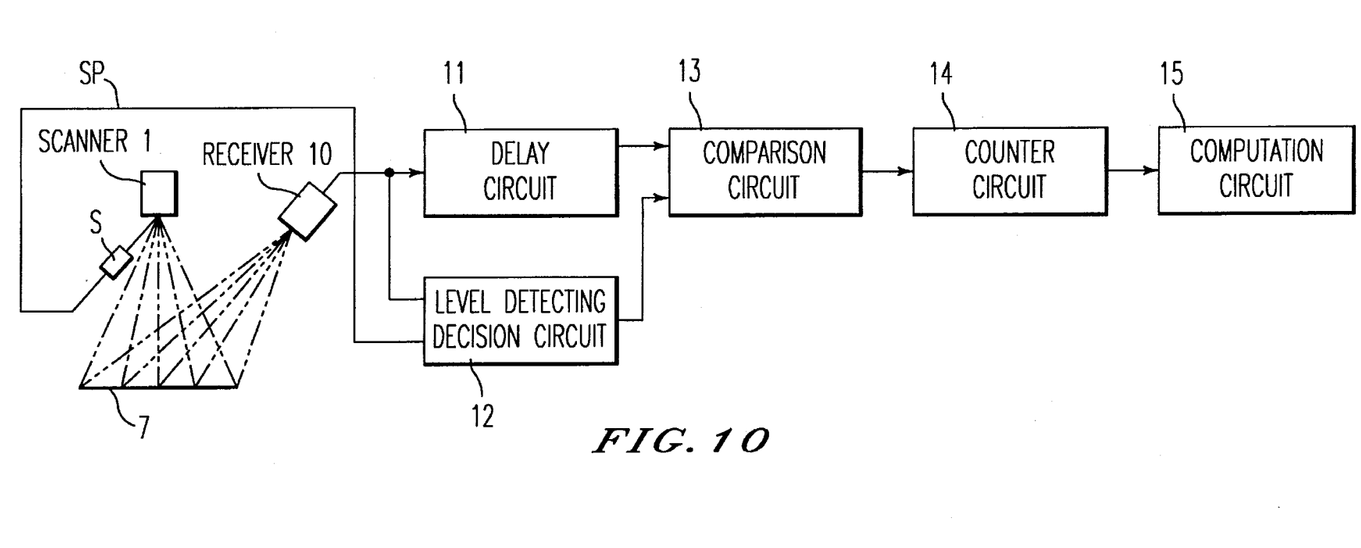
FIG. 10 is a block diagram showing a sixth embodiment of this invention.
Figure 11:
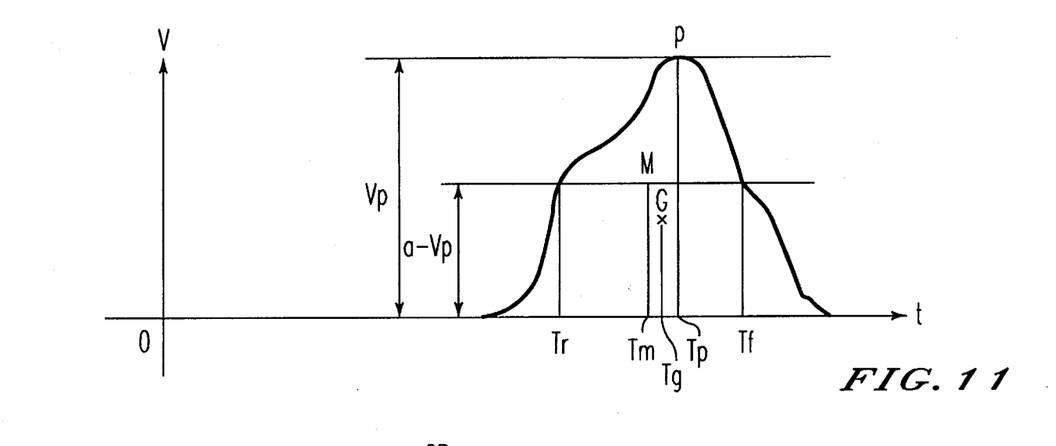
FIG. 11 is a view given in explanation of an algorithm for determining the time-point of generation of a pulse signal in the sixth embodiment.

A sixth embodiment of this invention is shown in FIG. 10 and FIG. 11. In embodiments 1 to 5 described above, the surface shape of the measurement subject is detected by measuring the time-points of generation of pulse signals generated from a photoelectric converter every time the image of the light point passed through each aperture of the slit plate, taking the time-point of commencement of scanning as the origin. However, it is sometimes difficult to ascertain the time point at which this pulse signal is generated, owing to the variation in peak value and waveform of these pulse signals due to the optical conditions. When there is only a single aperture, a repeatedly generated pulse signal has a practically fixed value, so it is convenient to take the time-point of generation of the pulse signal as the intermediate point of the rectangular pulse obtained by discriminating at a suitable slice level. However, such a method cannot be adopted in the case of the embodiments described above, owing to the different peak values and waveforms of each of the pulse signals. In this embodiment and the embodiments up to the ninth embodiment, means are therefore provided for accurately finding this pulse signal generation time-point irrespective of the different peak value and waveform of the respective pulse signals.

First of all, in this embodiment, a basic constructional example, including the seventh and eighth embodiments, of such means is indicated. In FIG. 10, 10 is a receiver that generates a pulse signal every time the image of the light point that is scanned over the surface of measurement subject 7 by scanner 1 passes a plurality of apertures. Receiver 10 is equipped with the functions of a lens 2, a slit plate 3 having a plurality of apertures, and a photoelectric converter 4 as described in the first embodiment. The pulse signal that is generated by receiver 10 is input to a level detecting decision circuit 12 that outputs the required information for finding the time-point of generation of each pulse signal, and to a delay circuit 11 wherein the pulse signals, or the pulse signal after prescribed processing, is delayed by a fixed time. The time-point of generation of each pulse signal is found by inputting the information from level detecting decision circuit 12 and the delayed signal from delay circuit 11 to comparison circuit 13, and is input to a counter circuit 14. Then the time from commencement of scanning up to the time-point of generation of this pulse signal is counted by counter circuit 14. 15 is a computation circuit that uses this count value to find the position of the light point on the surface of measurement subject 7.

Signal processing circuit 5 of the embodiment, such as shown in FIG. 1, is equipped with the function of delay circuit 11, level detection decision circuit 12, comparison circuit 13, counter circuit 14 and computation circuit 15.

Next, the operation of this embodiment will be described with reference to FIG. 11. In FIG. 11, time t is shown along the abscissa and signal level v of the pulse signal is shown along the ordinate. As the required information for finding the time-point of generation of the pulse signal, level detecting decision circuit 12 outputs a decision level signal $\alpha \cdot vp$ proportional to the peak level $vp$ of each pulse signal, or the waveform area signal and the half-value $S/2$ of the waveform area $S$ etc. In the case where the required information is the decision level signal $\alpha \cdot vp$, comparator circuit 13 finds time points $Tr$ and $Tf$ by using this decision level signal $\alpha \cdot vp$ to discriminate the pulse signal delayed by delay circuit 11. From these, it finds their mid-point $Tm$, and regards this as the time-point of generation of the pulse signal. In the case where the required information is the waveform area signal and $S/2$, the waveform area signal delayed by delay circuit 11 is discriminated by $S/2$, and the center of gravity point $Tg$ of this pulse signal is regarded as the time-point of generation of the pulse signal. Further, in the case of taking $\alpha=1$ in the aforementioned decision level signal $\alpha \cdot vp$, the peak level time-point $Tp$ of the pulse signal is regarded as its generation time-point. In this way, the generation time-points can be accurately found even if the peak values and waveforms of the various pulse signals generated from receiver 10 are different. After this, counter circuit 14 counts the time from commencement of scanning up to the time-point of generation of each pulse signal, so that the surface shape of measurement subject 7 can be accurately found by calculation circuit 15 from these count values.

Figure 12:
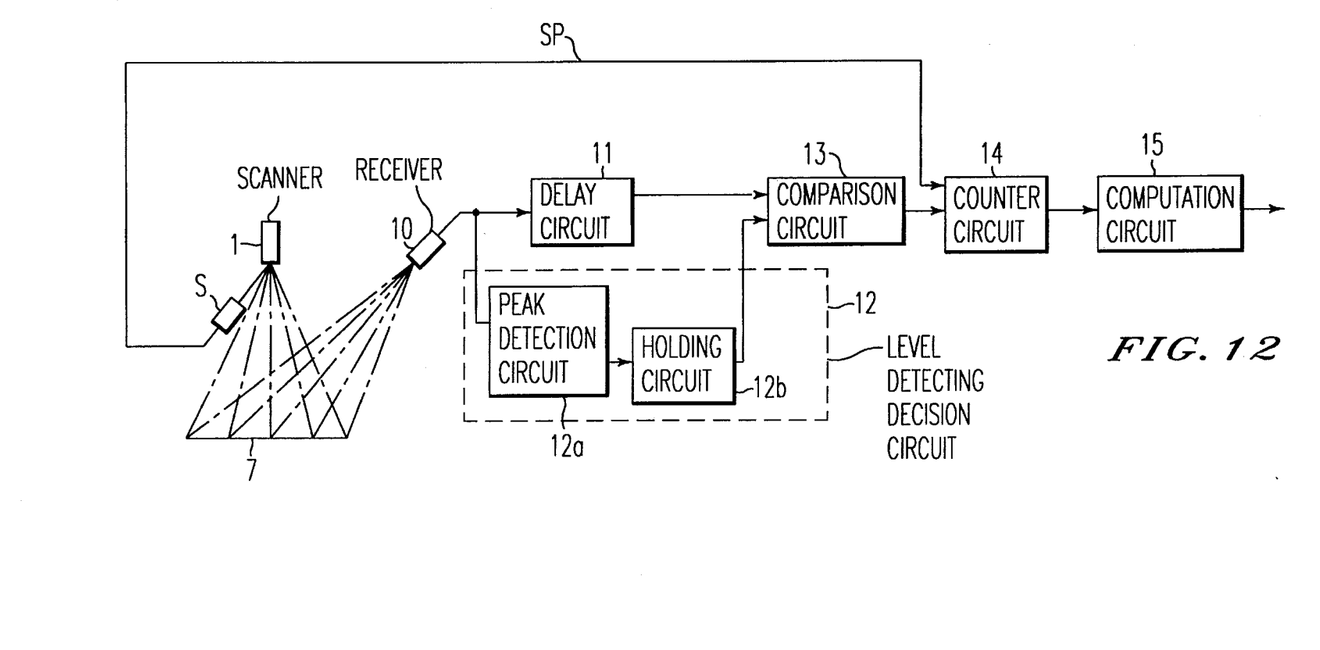
FIG. 12 is a block diagram showing a seventh embodiment of this invention.

A seventh embodiment of this invention is shown in FIG. 12 and FIG. 13. This embodiment shows a specific construction example of level detecting decision circuit 12. Level detecting decision circuit 12 is constituted of a peak detection circuit 12a that detects the peak level $vp$ of the pulse signal from receiver 10, and a holding circuit 12b that holds a level $\alpha \cdot vp$ proportional to this peak level $vp$. Decision level signal $\alpha \cdot vp$ is delivered as an output from level detecting decision circuit 12. Comparison circuit 13 finds the time-point of generation of the pulse signal by discriminating the pulse signal delayed by delay circuit 11 by means of decision level signal $\alpha \cdot vp$.

Figures 13A, 13B, 13C, 13D:
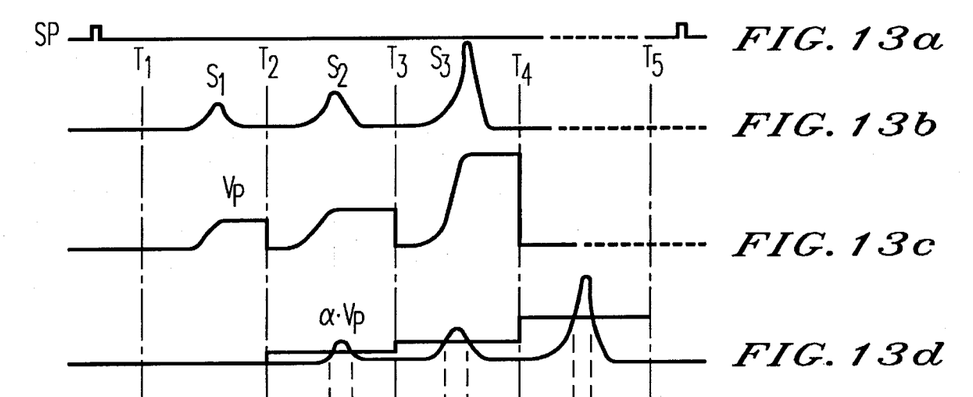
FIG. 13 is a timing chart given in explanation of the operation of the seventh embodiment of this invention.
Figure 13E:
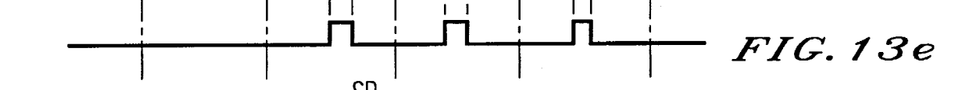

The operation of this embodiment will now be described using the time chart of FIG. 13. SP in FIG. 13(a) is the scanning commencement pulse generated when scanning is commenced. FIG. 13(b) shows the pulse signal that is output from receiver 10. This is a pulse train consisting of pulses S1, S2 and S3, . . . generated every time the light passes through a plurality of apertures. T1, T2 and T3, . . . are the boundary points of the measurement pitch of the surface shape and are all in fixed relationship from pulse SP. The time-points of generation of the respective pulse signals may therefore be measured from these boundary points. FIG. 13(c) shows the peak level $vp$ that is output from peak detection circuit 12a. The peak level $vp$ of each pulse signal S1, S2, . . . is found at each time-point T2, T3, . . . . FIG. 13(d) is the output of delay circuit 11. The pulse signals S1, S2, . . . of each measurement pitch interval are output delayed by one interval. Decision level $\alpha \cdot vp$ (where $\alpha$ is for example ½) is the output of holding circuit 12b. FIG. 13(e) shows the discrimination output of comparison circuit 13, which outputs a square wave pulse when the level of each pulse signal S1, S2, . . . exceeds decision level $\alpha \cdot vp$. Counter circuit 14 determines the time-point of generation of each pulse signal as the mid-point of the rise and fall of this square wave pulse, and finds the time from the commencement of scanning up to the time-point of pulse generation by counting the time from the measurement pitch boundary. With this embodiment, even though the peak value and waveform of the pulse signals output from receiver 10 are constantly changing, the time-point of generation of each pulse signal can be accurately found. Thus, high speed operation is feasible since complex computational operations etc. are not required, and cost reduction can be achieved owing to the simplicity of the circuit.

Figure 14:
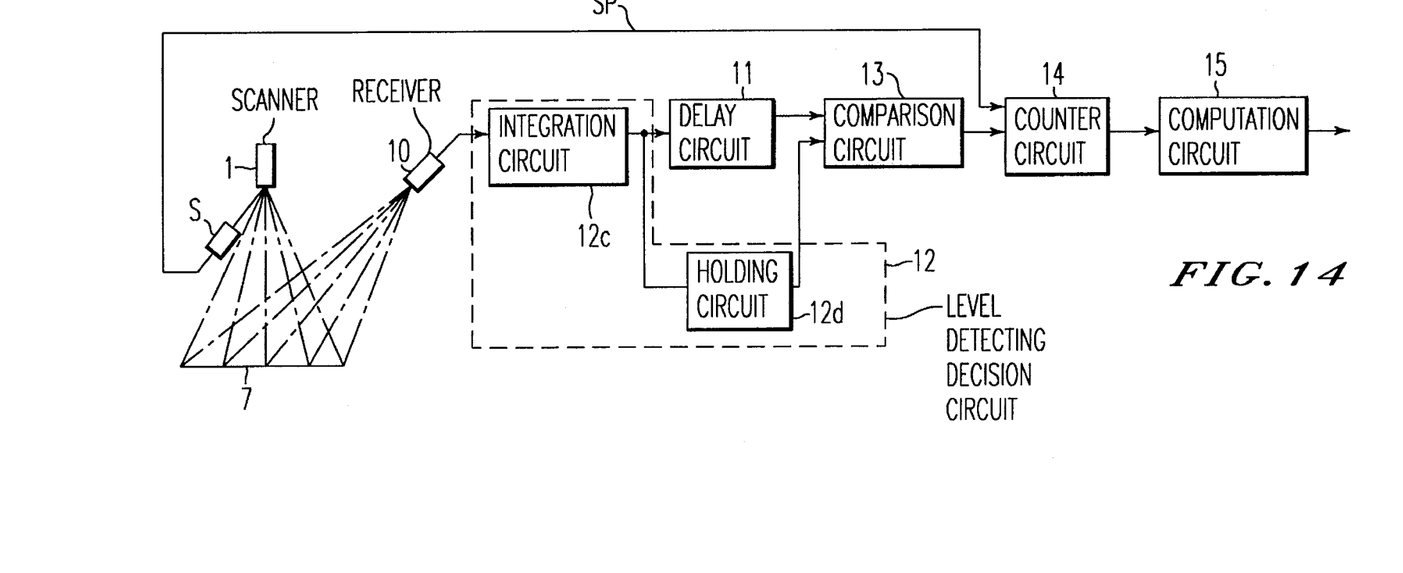
FIG. 14 is a block diagram showing an eighth embodiment of this invention.

An eighth embodiment of this invention is illustrated in FIG. 14 and FIG. 15. This embodiment shows a further specific constructional example of level detecting decision circuit 12. Level detecting decision circuit 12 is constituted of an integration circuit 12c that finds the waveform area by integrating, at each measurement pitch, the pulse signal from the receiver 10, and a holding circuit 12d that holds the value $S/2$, which is ½ of this integrated waveform area $S$. This waveform area signal is output to delay circuit 11 which delays this signal by one interval. The $S/2$ signal is output to comparison circuit 13. Comparison circuit 13 discriminates the waveform area signal delayed by delay circuit 11 by the $S/2$ signal, and finds the time-point of generation of the pulse from the center of gravity point of the pulse signal.

Figures 15A, 15B, 15C, 15D, 15E:
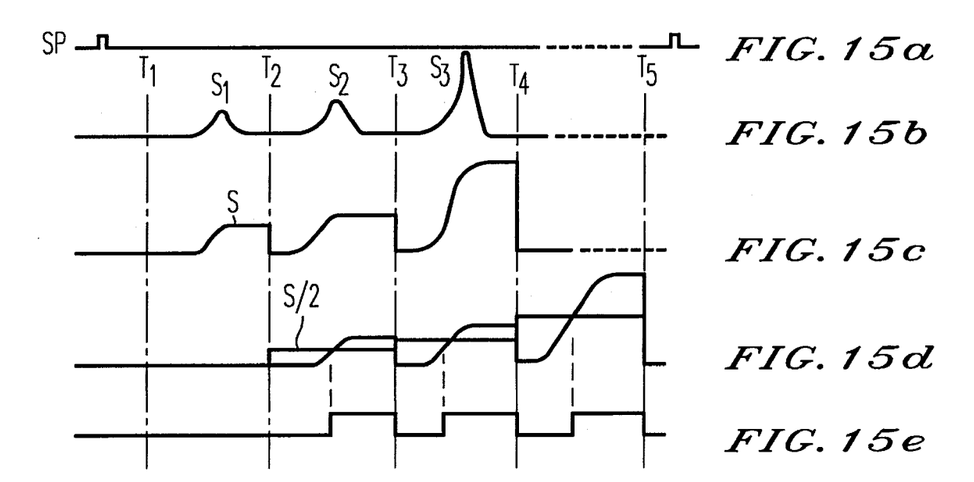
FIG. 15 is a timing chart given in explanation of the operation of the eighth embodiment of this invention.

The operation of this embodiment will now be described using the time chart of FIG. 15. FIGS. 15(a) and (b) are the same as in the case of FIG. 13 described above. FIG. 15(c) shows the waveform area signal which is the output of integrating circuit 12c. This is obtained by integrating each pulse signal. Its final value corresponds to the waveform area S of the pulse signal. FIG. 15(d) shows the waveform area signal delayed by one measurement pitch. FIG. 15(e) shows the waveform obtained by discriminating this by S/2. The time-point of the rise of this waveform gives the half-point of the waveform area S of each pulse signal, i.e. the center of gravity point. This time-point is taken as the time-point of generation of the pulse signal. This embodiment gives a truer pulse generation time-point than the seventh embodiment described above in the case where the waveform of the pulse signal is not left-right symmetrical. The time-point of generation of the pulse signal can be found without needing complicated computation, in a simple manner and at high speed.

Figure 16:
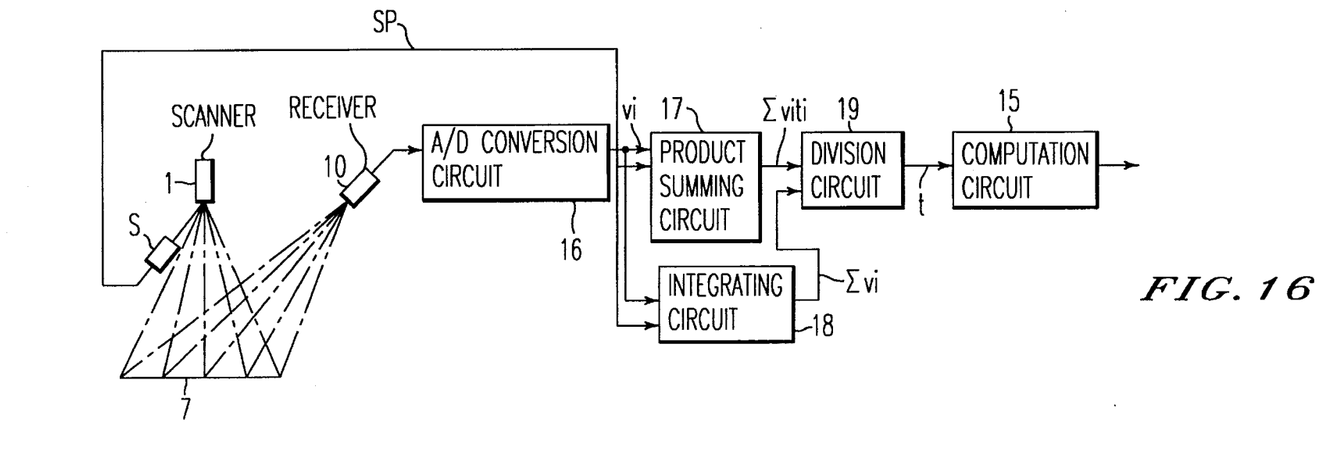
FIG. 16 is a block diagram showing a ninth embodiment of this invention.
Figure 17:
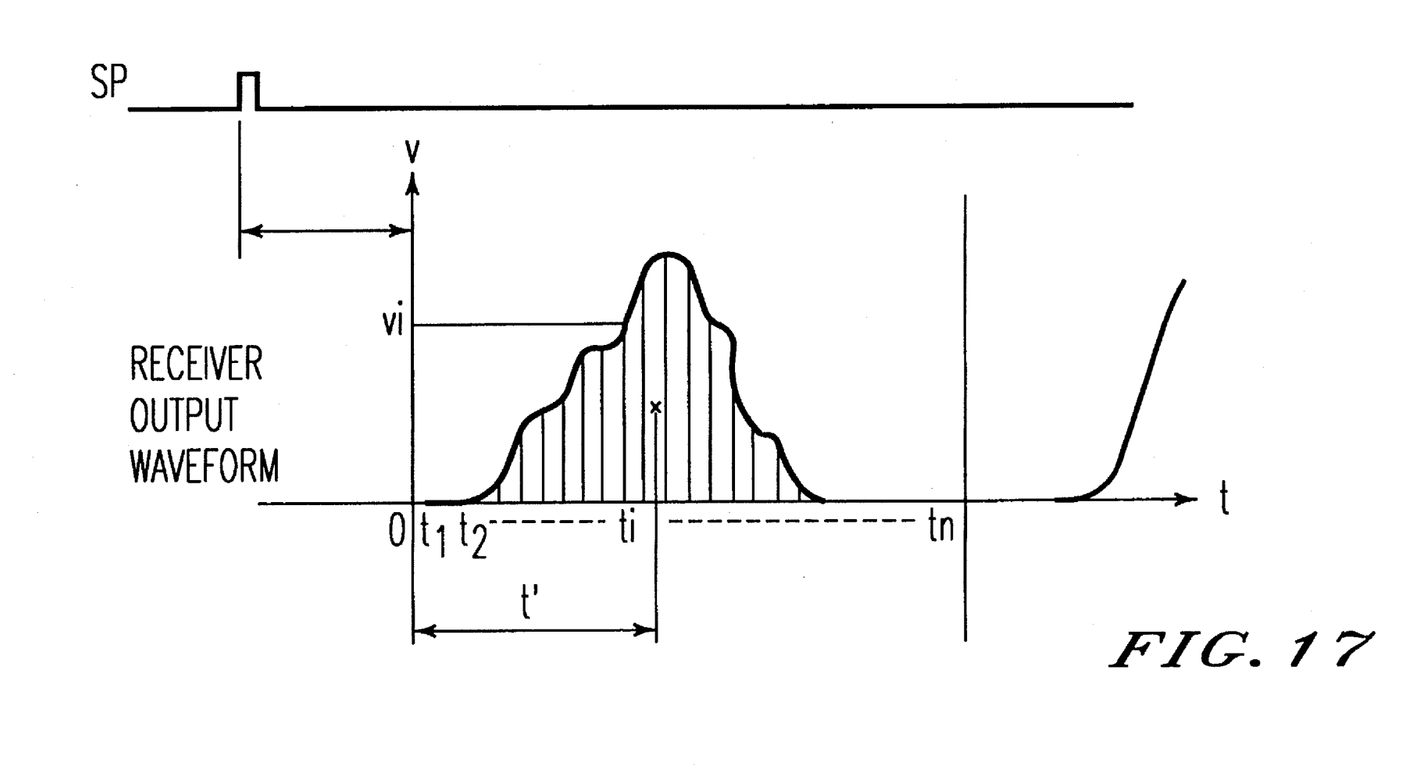
FIG. 17 is a view given in explanation of the operation of the seventh embodiment of this invention.

A ninth embodiment of this invention is shown in FIG. 16 and FIG. 17. In this embodiment, there are provided an A/D conversion circuit 16 that digitizes the pulse signal output from receiver 10, a product-summing circuit 17 that adds the products of this digitized pulse signal value and the time from the starting point of the measurement pitch, an integrating circuit 18 that adds the digitized pulse signal values, a division circuit 19 that finds the center of gravity of the pulse signal from the two outputs of product-summing circuit 17 and integrating circuit 18, and computation circuit 15 that calculates the surface position of measurement subject 7 from the output of this division circuit 19, i.e. from the time-point of generation of the pulse signal.

The operation of this embodiment will now be described using FIG. 17. Let us assume that output signal levels v1, v2, . . . vi . . . are obtained from receiver 10 at time-points t1, t2, . . . ti . . . taking as the origin the starting point of the measurement pitch interval. Product-summing circuit 17 calculates:

$$v = v1 \cdot t1 + v2 \cdot t2 + \ldots + vi \cdot ti + \ldots$$

and integrating circuit 18 finds:

$$S = v1 + v2 + \ldots vi + \ldots$$

Division circuit 19 finds $$t' = V/S$$

from the above V and S values. This t' gives the center of gravity of the pulse signal waveform. Its value is then taken as the time-point of generation of each pulse signal. In this way, in this embodiment, the time-point of generation of the pulse signal within the measurement pitch interval is accurately given by the time-point of ending of the measurement pitch interval.

Circuits 11 through 19 shown in the sixth through ninth embodiments can be constructed specifically by those skilled in the art based on the function thereof described above, with microprocessor, operational amplifies and discrete hardware elements. So the detailed description thereof may be omitted.

One example of making use of the surface shape measured by this invention will be described in brief. In the case where the measurement subject is a steel plate, the flatness factor of the steel plate is calculated based on the measured surface shape. The flatness factor is applied to control a rolling mill so that the flatness of the steel plate is improved.

The detail of such a control is well known to those skilled in the art, and does not relate directly to this invention, so that the detailed description thereof may be omitted.

As described above, this invention ascertains the position of the light point on the surface of the measurement subject on the basis of the time from the commencement of scanning up to the time-point of generation of the pulse signal from the photoelectric converter. Since the time-point at which the image of the optical point passes through a point on the locus is in a fixed geometrical relationship with the position on the surface of the measurement subject, the surface shape of the measurement subject can be determined at high speed and in detail using only a single photoelectric converter. The surface shape of strip-shaped articles running at high speed can therefore be accurately determined. Also, the power of the light source can be reduced, since the energy of the light source is effectively employed in measurement of each of the points that pass the apertures. The space required for providing a surface shape measurement device according to this invention is also reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A surface shape measurement device for measuring a surface shape of a measurement subject, said device comprising:
   scanner means for scanning said surface of said measurement subject with a light point;
   lens means for focusing an image of said light point on said surface of said measurement subject;
   a slit plate member arranged at a position of a focal plane of said light point and having a plurality of apertures on a locus of said image of said light point;
   photoelectric converter means arranged at a position to receive said light passing through said plurality of apertures for converting said light into a pulse signal;
   pulse generator means for generating a scanning commencement pulse when said scanner means commences scanning;
   signal processing means connected to receive said pulse signal from the photoelectric converter means and to receive said scanning commencement pulse from said pulse generator means for determining a position of said light point on said surface of said measurement subject based on a time-point of generation of said pulse signal and from a time of receiving said scanning commencement pulse, wherein said signal processing means includes:
   level detecting decision means connected to receive said pulse signal from said photoelectric converter means for generating an information signal to find said time-point of generation of said pulse signal;
   delay means connected to receive said pulse signal as an input signal thereof and for generating a delayed signal by delaying said input signal by a fixed time;
   comparison means for comparing said delayed signal with said information signal to generate a comparison signal indicating said time-point of generation of said pulse signal based on a comparison result;
   counting means for counting a time from a commencement of scanning by said scanner means up to said time-point of generation of said pulse signal to generate a count value indicating said time; and calculation means for determining said position of said light point on said surface of said measurement subject based on said count value;

whereby said surface shape of said measurement subject being measured based on said position determined by said signal processing means.

2. The surface shape measurement device according to claim 1, wherein:

said lens means is positioned such that a center point thereof is located approximately on a plane containing light beams issued from said scanner means;

whereby said locus of said image of said light point is a straight line, irrespective of said surface shape of said measurement subject.

3. The surface shape measurement device according to claim 2, wherein:

said lens means is positioned such that a center plane thereof is located approximately perpendicular to said plane containing light beams issued from said scanner means.

4. The surface shape measurement device according to claim 1:

wherein said scanner means includes a laser beam scanned by rotating mirrors.

5. The surface shape measurement device according to claim 1:

wherein said scanner means includes a parallel optical scanning type scanner.

6. The surface shape measurement device according to claim 4:

wherein said scanner means includes a two-dimensional scanner which scans said surface of said measurement subject two-dimensionally with said light point.

7. The surface shape measurement device according to claim 1, wherein:

said delay means delays said pulse signal by a measuring pitch time as said fixed time;

said level detecting decision means includes,
peak detection means connected to receive said pulse signal for detecting a peak level of said pulse signal, and
holding means for holding said peak level and for generating said peak level as said information signal during next said measuring pitch time;

whereby said comparison signal indicating said time-point is determined by discriminating said pulse signal delayed by said delay means by said peak level held in said holding means.

8. The surface shape measurement device according to claim 1, wherein:

said level detecting decision means includes,
integrating means for integrating said pulse signal to generate a waveform area signal indicating an integrated value of said pulse signal at a measurement pitch time, and
holding means for holding a value of one-half of said integrated value at an end of said measurement pitch time as a half waveform area value and for generating said half waveform area value as said information signal during next said measuring pitch time; and said delay means receives said waveform area signal as said input signal and delays said waveform area signal by said measuring pitch time as said fixed time;

whereby said comparison signal indicating said time-point is determined by discriminating said waveform area signal delayed by said delay means by said half waveform area value held in said holding means.

9. The surface shape measurement devide according to claim 1, wherein said signal processing means includes:

A/D converter means connected to receive said pulse signal from said photoelectric converter means for digitizing said pulse signal to generate a digitized pulse signal;

product summing means connected to receive said digitized pulse signal for adding products of values of said digitized pulse signal and values of time from said commencement of scanning to generate a product signal;

integrating means for adding values of said digitized pulse signal from said commencement of scanning to generate an integrated signal;

division means for dividing said product signal by said integrated signal to generate a center point of said pulse signal; and calculation means for determining said position of said light point on said surface of said measurement subject based on said center point of said pulse signal.

* * * * *